US011614428B2

(12) United States Patent
Hollnagel (10) Patent No.: US 11,614,428 B2
(45) Date of Patent: Mar. 28, 2023

(54) LIQUID CHROMATOGRAPHY MULTI-DRAW METHOD, SYSTEM AND USE FOR SAMPLING

(71) Applicant: DIONEX SOFTRON GMBH, Germering (DE)

(72) Inventor: Christoph Hollnagel, Gauting (DE)

(73) Assignee: Dionex Softron GmbH, Germering (DE)

( * ) Notice: Subject to any disclaimer, the term of this patent is extended or adjusted under 35 U.S.C. 154(b) by 365 days.

(21) Appl. No.: 16/841,369

(22) Filed: Apr. 6, 2020

(65) Prior Publication Data

US 2020/0319146 A1 Oct. 8, 2020

(30) Foreign Application Priority Data

Apr. 4, 2019 (DE) .......................... 102019108868.2
Mar. 23, 2020 (DE) .......................... 102020107910.9

(51) Int. Cl.
*G01N 30/24* (2006.01)
*G01N 30/20* (2006.01)
(Continued)

(52) U.S. Cl.
CPC ............. *G01N 30/24* (2013.01); *G01N 30/16* (2013.01); *G01N 30/20* (2013.01); *G01N 30/461* (2013.01);
(Continued)

(58) Field of Classification Search
CPC ....... G01N 2030/027; G01N 2030/201; G01N 2030/207; G01N 2030/326;
(Continued)

(56) References Cited

U.S. PATENT DOCUMENTS 3,530,721 A 9/1970 Hrdina
4,939,943 A * 7/1990 Strohmeier ............ G01N 30/22
73/864.21
(Continued)

FOREIGN PATENT DOCUMENTS

CN 103574153 A 2/2014
CN 104833745 A 8/2015
(Continued)

OTHER PUBLICATIONS

Shang, Dengxi "Principle and Application of Gas Chromatographs," Teaching Reference Book for Colleges and Unversities, Oct. 31, 1989, 13 pages.
First Office Action dated May 20, 2022, to CN Patent Application No. 202010254735.2.

*Primary Examiner* — David L Singer (57) ABSTRACT

A method for collecting a sample for sample analysis includes drawing a first portion of the sample into a sample storage portion of a chromatography system while the chromatography system is in a first configuration. The method further comprising switching the chromatography system to a second configuration; sealing an end of a sample pick-up needle and draining a portion of a liquid from the second tubing; switching the chromatography system to a third configuration; drawing a second portion of the sample into the sample storage portion of the chromatography system; switching the chromatography system to an injection configuration; and fluidly connecting the sample storage portion to the chromatography column and supplying the first portion of the sample and the second portion of the sample from the sample storage portion to the chromatography column.

11 Claims, 6 Drawing Sheets

(51) Int. Cl.
*G01N 30/46* (2006.01)
*G01N 30/16* (2006.01)
*G01N 30/60* (2006.01)
*G01N 30/32* (2006.01)
*G01N 30/02* (2006.01)
*G01N 30/38* (2006.01)
*G01N 30/36* (2006.01)
*G01N 30/22* (2006.01)

(52) U.S. Cl.
CPC .............. *G01N 30/22* (2013.01); *G01N 30/32* (2013.01); *G01N 30/36* (2013.01); *G01N 30/466* (2013.01); *G01N 30/6026* (2013.01); *G01N 2030/027* (2013.01); *G01N 2030/201* (2013.01); *G01N 2030/207* (2013.01); *G01N 2030/326* (2013.01); *G01N 2030/385* (2013.01)

(58) Field of Classification Search
CPC .. G01N 2030/385; G01N 30/02; G01N 30/16; G01N 30/18; G01N 30/20; G01N 30/22; G01N 30/24; G01N 30/32; G01N 30/36; G01N 30/461; G01N 30/466; G01N 30/6026
See application file for complete search history.

(56) References Cited

U.S. PATENT DOCUMENTS

| | | | | |
|---|---|---|---|---|
| 2014/0318274 | A1* | 10/2014 | Zimmerman | G01N 30/24 73/863 |
| 2016/0377580 | A1* | 12/2016 | Wachinger | G01N 30/20 73/61.55 |
| 2017/0322187 | A1* | 11/2017 | Thielsch | B01D 15/12 |
| 2018/0128792 | A1* | 5/2018 | Wachinger | G01N 30/24 |

FOREIGN PATENT DOCUMENTS

| | | |
|---|---|---|
| CN | 107850514 A | 3/2018 |
| CN | 108072721 A | 5/2018 |
| CN | 108072723 A | 5/2018 |
| CN | 108072724 A | 5/2018 |
| DE | 102014115087 A1 | 4/2016 |
| EP | 0327658 A1 | 8/1989 |
| EP | 1203953 A2 | 5/2002 |
| EP | 1883811 A1 | 2/2008 |
| JP | S60143775 A | 7/1985 |
| JP | H10170488 A | 6/1998 |
| JP | 2003075419 A | 3/2003 |

* cited by examiner

Fig. 12 large-sized, particular, it is an object of the present invention to provide a method and
LIQUID CHROMATOGRAPHY MULTI-DRAW METHOD, SYSTEM AND USE FOR SAMPLING

CROSS REFERENCE TO RELATED APPLICATION(S)

This application claims the priority benefit under 35 U.S.C. § 119 to German Patent Application No. 10 2019 108868.2, filed on Apr. 4, 2019, and to German Patent Application No. 10 2020 107910.9, filed on Mar. 23, 2020. The disclosure of German Patent Application No. 10 2019 108868.2 is incorporated herein by reference in its entirety.

TECHNICAL FIELD

The invention lies in the field of liquid chromatography (LC) and particularly in the field of High-Performance Liquid Chromatography (HPLC). The goal of this analytical method is the division of a sample into its constituent parts followed by quantifying of their respective proportions, or simple separation. More particularly, the present invention relates to a liquid chromatography system, a method performed in such a system and a corresponding use of a system.

BACKGROUND

In LC systems, a liquid sample is introduced into a separation column, for example, using an analytical pump. Adhesion of different constituents of the sample to the separation column takes place in different, distinctive manners. A pump pushes a solvent (or a plurality of solvents) through the separation column. Depending on, inter alia, the adherence of the constituents to the separation column, the solvent, the flow rate of the solvent and the pressure of the solvent, the different constituents of the sample need different amounts of time to pass through the separation column; generally, the more strongly a constituent interacts with the separation column, the longer it will need to pass through the separation column. This allows the constituents (and thus, the sample) to be determined and analyzed.

Introducing of a sample into a separation column typically comprises several different steps. First, a sample pick up means, such as a needle, is introduced into a sample reservoir and picks up the sample. Second, the sample may then be introduced from the needle into a section for intermediate storing of the sample. Subsequently, the sample may be introduced from the section for intermediate storing of the sample into the separation column. For the above steps, one or more injection valves may be used. Such injection valves or distribution valves may connect different ports with one another to establish a fluid connection between different parts or sections of an LC system.

For instance, U.S. Pat. No. 3,530,721 discloses an apparatus for supplying liquid samples into a separation column. The samples are initially within reservoirs disposed on a turntable. A take-off needle sequentially removes the samples as the turntable positions the reservoirs, adjacent the take-off needle. According to this invention the samples are first pumped to an intermediate receptacle prior to being switched to the eluent stream and the chromatography column.

Furthermore, U.S. Pat. No. 4,939,943 discloses a sample injector for a liquid chromatograph which comprises a high-pressure syringe unit, a sample intake unit having a needle which can be introduced into a sample container as well as into a seat, and a 6/2-way valve.

Generally, a sample may be taken by means of a syringe pump, which may also be referred to as metering device (MD). Depending on the setup, the metering device may be either connected in such a way that it may be located subsequently in an analytical flow together with the sample (split loop design) and exposed to system pressure, or it may be in a path that is not flushed by an analytical flow (pulled loop pushed loop design).

The arrangement in the analytical flow has advantages above all due to a low carry-over and the safeguarding of the entire suction path always carrying a fresh fluid which is clearly gradient-defined, because the MD is constantly flushed through.

In order to ensure a good reproducibility of the drawn-in sample quantity, drawing-in of the sample is usually started at the same piston position of the metering device, i.e. idle volume, which is usually greater than zero, as some way is advantageously provided for backlash compensation and, if necessary, for sample pre-compression and back-up (in systems with several drives/pistons).

While known systems are satisfactory in some regards, they have certain disadvantages and limitations. In particular, they only allow a relatively small and limited volume of the sample to be introduced into the system at once. Depending on the subsequent analysis, this may be disadvantageous.

SUMMARY

In light of the above, it is therefore an object of the present invention to overcome or at least to alleviated the shortcomings and disadvantages of the prior art. More particularly, it is an object of the present invention to provide a method and a corresponding system for management and collection of samples with an increased performance and sampling volume range.

In a first aspect, the present invention relates to a method for collecting a sample for sample analysis, the method comprising a system assuming a first configuration and drawing a first portion of the sample into a sample storage portion of the system in the first configuration, the system assuming a second configuration, which is different from the first configuration, and preparing the system in the second configuration to draw a second portion of the sample into the sample storage portion, the system assuming a third configuration and drawing the second portion of the sample into the sample storage portion in the third configuration, the system assuming an injection configuration, wherein the sample storage portion is fluidly connected to a chromatography column, and supplying the first portion of the sample and the second portion of the sample from the sample storage portion to the chromatography column, while the system is in the injection configuration.

That is, in simple words, the present method draws several portions of the sample before supplying the sample to the chromatography column. This is different to typical prior art disclosures which teach that only one portion of the sample (e.g., defined by one stroke of a metering device) is supplied to the column at once. Thus, e.g., when using a given metering device, an increased amount of sample can be supplied to the chromatography column. This increases the versatility of the method. In particular, the present invention allows samples in a great range and with a high accuracy to be supplied to a chromatographic column.

Typically, sampling volumes are limited by volume capacity and maximum stroke of pistons. Multi-drawing, i.e.

multiple drawing up of specimen by several piston strokes, with a sampling device located in a flow is not yet known. However, the approach for collecting a sample for analysis described in the present invention may be advantageous, as it may allow the process to be repeated (preferably a plurality of times) without adjusting a system nor changing components of a system between one sample collection and another. For example, the sample collection may be repeated a plurality of times until the entire sample storage portion is completely filled with a sample to be analyzed.

In simple words, the maximum sample quantity may no longer depend on limitations, for instance, of a piston and its maximum stroke length, but on the volume of the sample storage portion, which may be several times higher than that of a piston.

Moreover, independence of a method from limitations of a piston may further be advantageous, as the piston stroke and the piston size cannot be increased arbitrarily as it may consequently produce undesirable effects, such as, for example, increase of gradient delay volume (GDV).

Furthermore, other disadvantages of the prior art may be avoided by the present invention. For instance, it is only possible to draw an exact sample in the nanoliter range if the piston travel is very long in relation to the piston diameter, which may typically result in a contradiction between an exact dosage and a large dosage volume. This contradiction may be avoided by the approach of the present invention. In simple words, the collection method described above may allow a system to utilize a piston (which may be configured to exhibit an optimal piston travel and piston diameter ratio), and at the same allowing the system to perform the sample collection several times until a desired volume is achieved (which may be significantly higher than that of the piston's volume collection capacity).

The step of preparing the system to draw in a second portion of the sample may comprise sealing an end of the sample pick-up needle and then draining the system, which may allow to drain away any remaining liquid, for example, any remaining volume of solvents or a sample from a previous analysis.

The method may further comprise the system assuming an isolation configuration, and isolating the system from a surrounding environment in the isolation configuration, wherein the isolation configuration may be different form the first, second, and third configuration, and pressurizing the sample storage portion to a first pressure while the system may be in the isolation configuration. Thus, e.g., components which were previously at ambient pressure (e.g., the sample storage section) may be elevated in pressure. It will be understood that this step may be performed before fluidly connecting the sample storage section to the chromatography column. In other words, the sample may be "pre-compressed" before being supplied to the chromatography column. This may be advantageous, as thus abrupt pressure changes and their adverse effects may be avoided.

The chromatography column may be a separation column.

The third configuration may be identical to the first configuration.

The first portion of the sample and the second portion of the sample may be supplied together from the sample storage portion to the chromatography column.

The system may not assume the injection configuration between the system assuming the first configuration and the system assuming the third configuration.

The system may be a chromatography system.

The chromatography system may be a liquid chromatography system.

The liquid chromatography system may be a high-performance liquid chromatography system.

The first pressure may exceed the ambient pressure by at least 100 bar, preferably by at least 500 bar, further preferably by at least 1,000 bar.

The system may further comprise an analytical pump adapted to provide a flow of pressurized fluid.

The system may comprise a sampling device configured for drawing in the portions of the sample.

The sampling device may be a metering device. Using a metering device may be advantageous, as the metering device may serve for different purposes, such as, for example, it may be used to cause a positive pressure on the sample storage system, which may cause the sample to be transferred to the separation column. Furthermore, the metering may be used to generate a negative pressure in the sample storage system, which in combination with a sample pick-up means may allow the system to collect a sample to be analyzed.

The metering device may comprise at least two ports for fluidly connecting the metering device to other components of the system, wherein preferably each of the at least one port may be configured to selectively be opened and closed.

The metering device may draw in the first portion of the sample into the sample storage portion and the second portion of the sample into the sample storage portion and the metering device may pressurize the sample storage portion.

The metering device may comprise a housing and a piston.

The piston of the metering device can assume a plurality of positions to provide a mechanism for drawing in the first portion of the sample and the second portion of the sample.

The plurality of positions of the piston of the metering device may be used to drain the system.

The plurality of positions of the piston of the metering device may be used to pressurize the sample storage portion.

The plurality of positions of the piston of the metering device may be used to inject the sample into the chromatography column.

The system may comprise a sample pick-up means, a seat for receiving the sample pick-up means and a switching valve.

The sample pick-up means may be a needle.

The step of supplying the first portion of the sample and the second portion of the sample to the chromatography column may be performed by the sampling device.

The method may comprise depressurizing the sample storage portion of the system after supplying the first portion of the sample and the second portion of the sample to the chromatography column. Similar to the step of pressurization, this depressurizing step may be carried out in a controlled manner. In particular, this step may be carried out when the sample storage section is not fluidly connected to ambient atmosphere (e.g., before it is again fluidly connected to ambient atmosphere). Again, this may avoid abrupt changes of the pressure in the sample storage portion and adverse effects relates thereto.

The step of depressurizing the sample storage portion may be carried out by means of the sampling device.

The system may comprise a waste reservoir.

The system may comprise a pressure sensor, wherein the method may comprise the step of the pressure sensor sensing a pressure.

The pressure sensor may be fluidly connected to the sampling device.

The pressure sensor may be arranged between the sampling device and the switching valve.

The system may comprise a sample reservoir.

In the first configuration and in the third configuration, the sample pick up means may be fluidly connected to the sample reservoir, and the sampling device may not be fluidly connected to the waste reservoir.

In the first configuration and in the third configuration, the analytical pump may be fluidly connected to the chromatography column.

In the second configuration, the sampling device may be fluidly connected to the waste reservoir and the sample storage portion may be fluidly connected to a dead end.

The step of preparing the system to draw a second portion of the sample into the sample storage portion may comprise dispensing liquid into the waste reservoir.

The step of preparing the system to draw a second portion of the sample into the sample storage portion may comprise the piston pushing liquid out of the metering device. Thus, subsequently to this step, the piston may again be in a position allowing the metering device to draw in a further amount of the sample.

The sampling device may comprise a displacement volume and a volume defined by the first portion of the sample and the second portion of the sample may be greater than the displacement volume. Thus, it will be understood that embodiments of the present invention allow the system to draw in (and later introduce into the chromatography column) a sample volume exceeding the displacement volume of the sampling device.

The sample storage portion may comprise a sample loop.

The sample storage portion may comprise a trap column.

The system may assume the second configuration and prepare the system in the second configuration to draw an additional portion of the sample into the sample storage portion more than once before the system may assume the injection configuration, and wherein thus, at least one further additional portion of the sample may be supplied to the chromatography column together with the first portion and the second portion. That is, in embodiments of the present invention, the procedure of drawing in the sample is not only performed twice before supplying the sample to the chromatography column, but several times. Thus, an even greater amount of sample can be introduced at once into the chromatography column.

A volume may be defined by the portions of the sample being supplied together to the chromatography column, wherein a quotient of this volume divided by the displacement volume may be greater than 2, preferably greater than 5, such as greater than 10.

The step of pressurizing the sample storage portion to the first pressure may be performed after the step of drawing in the second portion of the sample into the sample storage portion and before the step of supplying the first portion of the sample and the second portion of the sample from the sample storage portion to the chromatography column. As laid out above, the sample storage portion may thus be brought to an elevated pressure in a controlled manner before this portion is fluidly connected to the chromatography column. Again, thus, abrupt changes in the pressure and their adverse effects may be avoided.

The separation column may be an analytical column or a preparative column.

The chromatography column may be a trap column.

In the step of drawing a first portion of the sample into the sample storage portion of the system, the first portion of the sample may travel from the sample pick-up means to the sample storage portion without passing through a switching valve.

The sampling device and the sample storage portion may be connected without a switching valve being present in the connection between the sampling device and the sample storage portion.

The sample storage section may be located between the sample pick-up means and the sampling device.

The system may comprises a metering device, a switching valve, a sample pick-up means, and a plurality of tubings to establish fluid connections between components of the system. The metering device may comprise ports. A tubing may connects a port of the metering device with the sample pick-up means, and another tubing may connect another port of the metering device with the switching valve. In the first configuration, the sample may be pulled into the tubing, i.e., the tubing that connects a port of the metering device with the sample pick-up means. It will be understood that this tubing may comprise the sample storage portion. In the second configuration, liquid in the other tubing is drained, i.e., liquid in the tubing connecting the other another port of the metering device with the switching valve.

In a second aspect the invention relates to a system configured to carry out the method recited herein.

The system may be a chromatography system.

The chromatography system may be a liquid chromatography system.

The chromatography system may be a high-performance liquid chromatography system.

The system may be configured to be pressurized to a first pressure exceeding the ambient pressure by at least 100 bar, preferably by at least 500 bar, further preferably by at least 1,000 bar.

The system may comprise: a sampling device, a sample pick-up means, sample storage portion, a seat for receiving the sample pick-up means, a chromatography column, an analytical pump adapted to provide a flow of pressurized fluid, a waste reservoir, a switching valve comprising a plurality of ports and a plurality of connecting elements for changeably connecting the ports of the switching valve.

The plurality of ports of the switching valve may comprise a port directly fluidly connected to the seat, a port directly fluidly connected to the chromatography column, a port directly fluidly connected to the analytical pump, and a port directly fluidly connected to the waste reservoir, wherein the system may be adapted to assume any of the configurations as recited herein.

The sampling device may be a metering device.

The sampling device may comprise a housing and a piston.

The sample pick-up means may be a needle.

The chromatography column may be a separation column.

The system may further comprise a pump solvent reservoir configured to supply the analytical pump with solvent for an analytical flow.

The system may comprise a pressure sensor.

The pressure sensor may be fluidly connected to the sampling device.

The pressure sensor may be arranged between the sampling device and the sample pick-up means.

The system may comprise a controller comprising a data processing unit, wherein the controller may be configured to control the system to carry out the method recited herein.

The pressure sensor may be arranged between the sampling device and the switching valve.

The sample storage portion may comprise a sample loop.

The sample storage portion may comprise a trap column.

The system may be configured to assume at least one and preferably all the configurations defined in the above method.

The separation column may be an analytical column or a preparative column.

The chromatography column may be a trap column.

The sampling device and the sample storage portion may be connected without a switching valve being present in the connection between the sampling device and the sample storage portion.

The sample storage section may be located between the sample pick-up means and the sampling device.

The sample pick-up means and the sample storage portion may be connected without a switching valve being present in the connection between the sample-pick up means and the sample storage portion.

The present invention also relates to a use of the system to carry out the method as recited herein.

In simple words, the present invention may concern a sampler for liquid chromatography, in particular, for high-performance liquid chromatography (HPLC). In HPLC, the sampler may fulfill tasks of, for example, sample management and exact collection of a sample to be analyzed. Moreover, the sampler may need to provide a good performance and a widest possible sample volume range.

In very simple words, embodiments of the present invention are related to a method that may allow multi-drawing a sample to be analyzed via using a metering device, which may be subsequently switched into an analytical flow. Furthermore, the described method overcomes limitations related, for example, to characteristics of systems, for instance, limitations of pistons, which may advantageous, as it may allow repeating the sample collection, i.e. repeating the suction process, as often as required, thus ensuring a sample volume which is independent of the piston size and piston stroke. Put differently, a drawn-in volume may be exhausted, for example, with a one piston stroke. However, the approach of the present invention may permit repeating the suction process as often as required, thus ensuring a sample volume which is independent of the piston size and piston stroke.

The present technology is also defined by the following numbered embodiments.

Below, method embodiments will be discussed. These embodiments are abbreviated by the letter "M" followed by a number. When reference is herein made to a method embodiment, those embodiments are meant.

M1. A method for collecting a sample for sample analysis, the method comprising a system assuming a first configuration and drawing a first portion of the sample into a sample storage portion of the system in the first configuration, the system assuming a second configuration, which is different from the first configuration, and preparing the system in the second configuration to draw a second portion of the sample into the sample storage portion, the system assuming a third configuration and drawing the second portion of the sample into the sample storage portion in the third configuration, the system assuming an injection configuration, wherein the sample storage portion is fluidly connected to a chromatography column, and supplying the first portion of the sample and the second portion of the sample from the sample storage portion to the chromatography column, while the system is in the injection configuration.

M2. The method according to the preceding embodiment, wherein the step of preparing the system to draw in a second portion of the sample comprises draining the system.

M3. The method according to any of the preceding embodiments, wherein the method further comprises the system assuming an isolation configuration, and isolating the system from a surrounding environment in the isolation configuration, wherein the isolation configuration is different form the first, second, and third configuration, and pressurizing the sample storage portion to a first pressure while the system is in the isolation configuration.

M4. The method according to any of the preceding embodiments, wherein the chromatography column is a separation column.

M5. The method according to any of the preceding embodiments, wherein the third configuration is identical to the first configuration.

M6. The method according to any of the preceding embodiments, wherein the first portion of the sample and the second portion of the sample are supplied together from the sample storage portion to the chromatography column.

M7. The method according to any of the preceding embodiments, wherein the system does not assume the injection configuration between the system assuming the first configuration and the system assuming the third configuration.

M8. The method according to any of the preceding embodiments, wherein the system is a chromatography system.

M9. The method according to any of the preceding embodiments, wherein the chromatography system is a liquid chromatography system.

M10. The method according to the preceding embodiment, wherein the liquid chromatography system is a high-performance liquid chromatography system.

M11. The method according to any of the preceding embodiments with the embodiments of embodiment M3, wherein the first pressure exceeds the ambient pressure by at least 100 bar, preferably by at least 500 bar, further preferably by at least 1,000 bar.

M12. The method according to any of the preceding embodiments, wherein the system further comprises an analytical pump adapted to provide a flow of pressurized fluid.

M13. The method according to any of the preceding embodiments, wherein the system comprises a sampling device configured for drawing in the portions of the sample.

M14. The method according to the preceding embodiment, wherein the sampling device is a metering device.

M15. The method according to the preceding embodiment, wherein the metering device comprises at least two ports for fluidly connecting the metering device to other components of the system, wherein preferably each of the at least one port is configured to selectively be opened and closed.

M16. The method according to any of the preceding embodiments and with the features of M14 and M3, wherein the metering device draws in the first portion of the sample into the sample storage portion and the second portion of the sample into the sample storage portion and wherein the metering device pressurizes the sample storage portion.

M17. The method according to any of the three preceding embodiments, wherein the metering device comprises a housing and a piston.

M18. The method according to the preceding embodiment wherein the piston of the metering device can assume a plurality of positions to provide a mechanism for drawing in the first portion of the sample and the second portion of the sample.

M19. The method according to the preceding embodiment, wherein the plurality of positions of the piston of the metering device is used to drain the system.

M20. The method according to the preceding embodiment, wherein the plurality of positions of the piston of the metering device is used to pressurize the sample storage portion.

M21. The method according to any of the preceding embodiments with the features of embodiment M18, wherein the plurality of positions of the piston of the metering device is used to inject the sample into the chromatography column.

M22. The method according to any of the preceding embodiments, wherein the system comprises a sample pick-up means, a seat for receiving the sample pick-up means and a switching valve.

M23. The method according to preceding embodiment, wherein the sample pick-up means is a needle.

M24. The method according to any of the preceding embodiments with the features of embodiment M13, wherein the step of supplying the first portion of the sample and the second portion of the sample to the chromatography column is performed by the sampling device.

M25. The method according to any of the preceding embodiments, wherein the method comprises depressurizing the sample storage portion of the system after supplying the first portion of the sample and the second portion of the sample to the chromatography column.

M26. The method according to the preceding embodiment and with the features of embodiment M13, wherein the step of depressurizing the sample storage portion is carried out by means of the sampling device.

M27. The method according to any of the preceding embodiments, wherein the system comprises a waste reservoir.

M28. The method according to any of the preceding embodiments, wherein the system comprises a pressure sensor, wherein the method comprises the step of the pressure sensor sensing a pressure.

M29. The method according to the preceding embodiment and with features of M13, wherein the pressure sensor is fluidly connected to the sampling device.

M30. The method according to the preceding embodiment and with the features of embodiment M22, wherein the pressure sensor is arranged between the sampling device and the switching valve.

M31. The method according to any of the preceding embodiments, wherein the system comprises a sample reservoir.

M32. The method according to any of the preceding embodiments with the features of embodiments M12, M13, M22, and M31, wherein
in the first configuration and in the third configuration, the sample pick up means is fluidly connected to the sample reservoir, and the sampling device is not fluidly connected to the waste reservoir.

M33. The method according to the preceding embodiment, wherein
in the first configuration and in the third configuration, the analytical pump is fluidly connected to the chromatography column.

M34. The method according to any of the preceding embodiments with the features of embodiments M12, M13, M22, and M31, wherein in the second configuration, the sampling device is fluidly connected to the waste reservoir and the sample storage portion is fluidly connected to a dead end.

M35. The method according to any of the preceding embodiments and with the features of embodiment M27, wherein
the step of preparing the system to draw a second portion of the sample into the sample storage portion comprises dispensing liquid into the waste reservoir.

M36. The method according to the preceding embodiment and with the features of embodiment M17, wherein the step of preparing the system to draw a second portion of the sample into the sample storage portion comprises the piston pushing liquid out of the metering device.

M37. The method according to any of the preceding embodiments with the features of embodiment M13, wherein the sampling device comprises a displacement volume and wherein a volume defined by the first portion of the sample and the second portion of the sample is greater than the displacement volume.

M38. The method according to any of the preceding embodiments, wherein the sample storage portion comprises a sample loop.

M39. The method according to any of the preceding embodiments, wherein the sample storage portion comprises a trap column.

M40. The method according to any of the preceding embodiments, wherein the system assumes the second configuration and prepares the system in the second configuration to draw an additional portion of the sample into the sample storage portion more than once before the system assumes the injection configuration, and wherein thus, at least one further additional portion of the sample is supplied to the chromatography column together with the first portion and the second portion.

M41. The method according to the preceding embodiment and with the features of embodiment M37, wherein a volume is defined by the portions of the sample being supplied together to the chromatography column, and wherein a quotient of this volume divided by the displacement volume is greater than 2, preferably greater than 5, such as greater than 10.

M42. The method according to any of the preceding embodiments with the features of embodiment M3, wherein the step of pressurizing the sample storage portion to the first pressure is performed after the step of drawing in the second portion of the sample into the sample storage portion and before the step of supplying the first portion of the sample and the second portion of the sample from the sample storage portion to the chromatography column.

M43. The method according to any of the preceding embodiments with the features of embodiment M25, wherein the separation column is an analytical column or a preparative column.

M44. The method according to any of the preceding embodiments when not dependent, wherein the chromatography column is a trap column.

M45. The method according to any of the preceding embodiments with the features of embodiment M22, wherein in the step of drawing a first portion of the sample into the sample storage portion of the system, the first portion of the sample travels from the sample pick-up means to the sample storage portion without passing through a switching valve.

M46. The method according to any of the preceding embodiments with the features of embodiment M13, wherein the sampling device and the sample storage portion are connected without a switching valve being present in the connection between the sampling device and the sample storage portion.

M47. The method according to any of the preceding embodiments with the features of embodiments M13 and M22, wherein the sample storage section is located between the sample pick-up means and the sampling device.

Below, system embodiments will be discussed. These embodiments are abbreviated by the letter "S" followed by a number. When reference is herein made to a system embodiment, those embodiments are meant.

S1. A system configured to carry out the method according to any of the preceding method embodiments.

S2. The system according to the preceding embodiment, wherein the system is a chromatography system.

S3. The system according to the preceding embodiment, wherein the chromatography system is a liquid chromatography system.

S4. The system according to any of the preceding system embodiments, wherein the chromatography system is a high-performance liquid chromatography system.

S5. The system according to any of the preceding system embodiments, wherein the system is configured to be pressurized to a first pressure exceeding the ambient pressure by at least 100 bar, preferably by at least 500 bar, further preferably by at least 1,000 bar.

S6. The system according to the any of the preceding system embodiments, wherein the system comprises
a sampling device,
a sample pick-up means,
a sample storage portion,
a seat for receiving the sample pick-up means,
a chromatography column,
an analytical pump adapted to provide a flow of pressurized fluid,
a waste reservoir,
a switching valve comprising a plurality of ports and a plurality of connecting elements for changeably connecting the ports of the switching valve.

S7. The system according to the preceding embodiment, wherein the plurality of ports of the switching valve comprise
a port directly fluidly connected to the seat,
a port directly fluidly connected to the chromatography column,
a port directly fluidly connected to the analytical pump, and
a port directly connected to the waste reservoir,
wherein the system is adapted to assume any of the configurations defined in embodiments M1.

S8. The system according to any of the preceding system embodiments and with features of embodiment S6, wherein the sampling device is a metering device.

S9. The system according to any of the preceding system embodiments with the features of embodiment S6 wherein the sampling device comprises a housing and a piston.

S10. The system according to any of the preceding system embodiments and with features of embodiment S6, wherein the sample pick-up means is a needle.

S11. The system according to any of the preceding system embodiments and with features of embodiment S6, wherein the chromatography column is a separation column.

S12. The system according to embodiment S6, wherein the system further comprises a pump solvent reservoir configured to supply the analytical pump with solvent for an analytical flow.

S13. The system according to any of the preceding system embodiments, wherein the system comprises a pressure sensor.

S14. The system according to the preceding embodiment and with the features of embodiment S6, wherein the pressure sensor is fluidly connected to the sampling device.

S15. The system according to the preceding embodiment, wherein the pressure sensor is arranged between the sampling device and the sample pick-up means.

S16. The system according to any of the system preceding embodiments, wherein the system comprises a controller comprising a data processing unit, wherein the controller is configured to control the system to carry out the method according to any of the preceding method embodiments.

S16. The system according to the penultimate embodiment, wherein the pressure sensor is arranged between the sampling device and the switching valve.

S17. The system according to any of the preceding system embodiments with the features of embodiment S6, wherein the sample storage portion comprises a sample loop.

S18. The system according to any of the preceding system embodiments with the features of embodiment S6, wherein the sample storage portion comprises a trap column.

S19. The system according to any of the preceding system embodiments, wherein the system is configured to assume at least one and preferably all the configurations defined in the above method embodiments.

S20. The system according to any of the preceding system embodiments with the features of embodiment S11, wherein the separation column is an analytical column or a preparative column.

S21. The system according to any of the preceding system embodiments when not dependent on S11, wherein the chromatography column is a trap column.

S22. The system according to any of the preceding system embodiments with the features of embodiment S6, wherein the sampling device and the sample storage portion are connected without a switching valve being present in the connection between the sampling device and the sample storage portion.

S23. The system according to any of the preceding system embodiments with the features of embodiment S6, wherein the sample storage section is located between the sample pick-up means and the sampling device.

S24. The system according to any of the preceding system embodiments with the features of embodiment S6, wherein the sample pick-up means and the sample storage portion are connected without a switching valve being present in the connection between the sample-pick up means and the sample storage portion U1. Use of the system according to any of the preceding system embodiments for carrying out the method according to any of the preceding method embodiments.

BRIEF DESCRIPTION OF THE FIGURES

The present invention will now be described with reference to the accompanying drawings which illustrate embodiments of the invention. These embodiments should only exemplify, but not limit, the present invention.

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

DETAILED DESCRIPTION OF EMBODIMENTS

Figure 1:
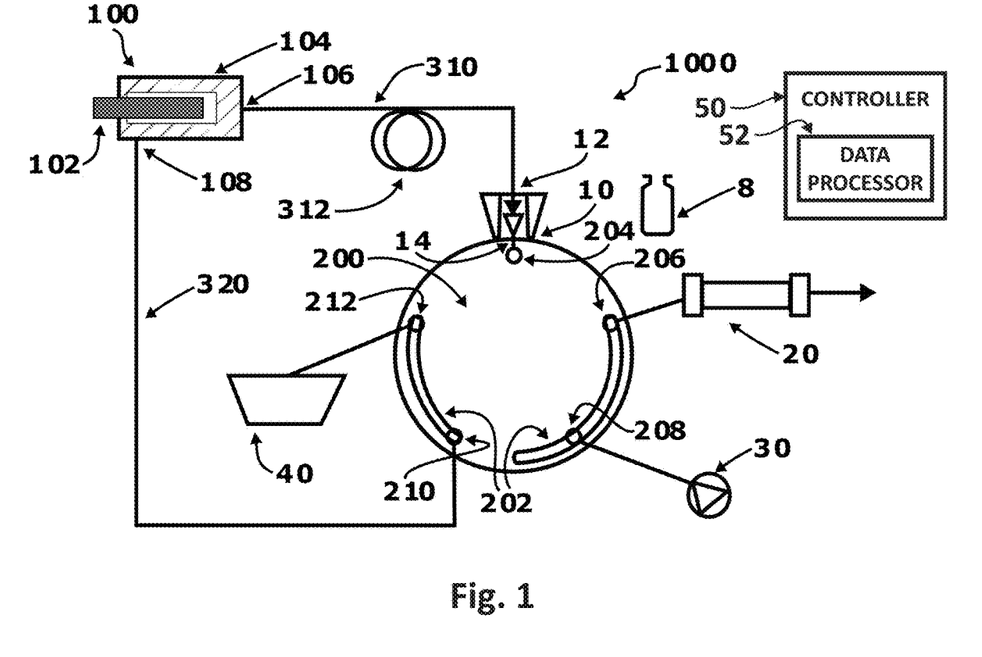
FIG. 1 depicts a liquid chromatography system according to embodiments of the present invention.

FIG. 1 schematically depicts a liquid chromatography system 1000 according to embodiments of the present invention. In simple terms, the liquid chromatography system 1000 may comprise a sampling device, such as a metering device 100, a switching valve 200, a sample pick-up means 12, a needle seat 14, a chromatographic column 20 (such as a separation column), a pump 30, a waste collector 40, a sample reservoir 8, and a plurality of tubings to establish fluid connections between the different components of the system 1000, such as, for example, the tubing identified by reference numerals 310 and 320. The liquid chromatography system 1000 may comprise a controller 50 comprising a data processing unit 52, wherein the controller may be configured to control the system to carry out the method recited herein.

Furthermore, the metering device 100 may further comprise a housing and a piston identified by reference numerals 102 and 104, respectively. Additionally or alternatively, the metering device 100 may also comprise connecting ports 106 and 108, which may also be simply referred to as ports 106 and 108.

It will be understood that the liquid chromatography system 1000 may be used to perform analysis in high liquid chromatography (HPLC), and therefore the system 1000 may also be referred to as a high liquid chromatography system 1000, which may be adapted to operate with pressures exceeding 100 bar, more preferably exceeding 1000 bar, most preferably exceeding 1500 bar.

The switching valve 200 may comprise a plurality of connecting ports identified by reference numerals 204, 206, 208, 210 and 212, and the switching valve 200 may be configured to selectively establish connections between the connection ports 204, 206, 208, 210. In the depicted embodiment, ports 210 and 212 may be connected to one another, ports 206 and 208 may be connected to one another, ports 208 and 210 may be connected to one another, and ports 204 and 206 may be connected to one another. It will be understood that ports being connected to one another denotes a fluid connection between the ports in such a way that no other functional element (except the element connecting the ports to one another) is in the fluid path between the ports. In the depicted embodiment, the switching valve 200 comprises a stator and a rotor. The stator comprises the ports 204, 206, 208, 210, 212, and the rotor comprises connecting elements 202 to connect the ports with one another. The rotor can be rotated with respect to the stator (e.g., see FIGS. 2 and 3) so that the connecting elements 202 establish connections between different ports. Thus, fluidic connections between the different components of the system 1000 connected to the switching valve 200 may be established, for example, the rotator may assume a configuration to establish a direct fluidic connection between the column 20 and the pump 30, as depicted in FIG. 3. It should be understood that the separation column 20 is merely exemplary and that in fact, other chromatographic columns, such as a trap column, can also be employed. Downstream of the chromatographic column 20, an analysis component may be provided. The separation column 20 can be realized either as an analytical column or as a preparative column.

In one embodiment, the system 1000 may comprise two or more switching valves. It will be understood that the two or more switching vales may be similar, identical and/or different from the switching valve 200.

The reservoir 8 may be adapted to contain a sample to be analyzed and therefore it may also be referred to as sample reservoir 8.

In one embodiment, the sample pick-up means 12 of the system 1000 may comprise a needle, therefore the sample pick-up means 12 may also be referred to as needle 12. The system 1000 may further comprise a seat 10 configured to serve as a rest position for the needle 12 and therefore it may also be referred to as needle seat 10.

In some embodiments, the system 1000 may also comprise a valve controlling a connection of the sampling device 100 to the needle 12. Such a valve may be located in the sampling device 100 or in the tubing 310.

In one embodiment of the present invention, the pump 30 may be connected to a reservoir (not depicted), which may be configured to contain a solvent, therefore it may also be referred to as solvent reservoir. In another embodiment, the pump 30 may be connected to two or more solvent reservoirs.

Furthermore, the system 1000 may also comprise a plurality of tubings or capillaries configured to connect a plurality of components of the system 1000. For instance, the tubing 310 may connect the port 106 of the metering device 100 with the needle 12. Furthermore, between the needle 12 and the metering device 100, the tubing 310 may also comprise a loop 312, which may be adapted to allocate solvent and/or sample, therefore it may also be referred to as solvent loop 312, sample loop 312 or simply as loop 312. In one embodiment, the tubing 310 may be adjacent to the sample pick-up means 12 and to the needle seat 10. Generally, it will be understood that the sample loop 312 is typically used to store sample before the sample is supplied to the separation column 20 (or another column). Thus, the section of the system comprising the sample loop 312 can also be referred to as a sample storage section. In the depicted embodiment, the sample storage section comprises the sample loop 312. However, it should be understood that the sample storage section is not limited to the sample loop 312. Alternatively or additionally, it may, for example, also comprise a trap column or any other component that is suitable for storing the sample.

In the depicted embodiment (see FIG. 1), the sample storage section 312 is located between ports 204, 210 of the switching valve 200. Further, in the depicted embodiment, also the sampling device 100 is located between these ports 204, 210 of the switching valve 200. In other words, liquid can flow from the sampling device 100 to the sample storage section 312 (and/or vice versa) without passing through a switching valve.

Additionally or alternatively, in the depicted embodiment, the sample pick up means 12 is located between these ports 204, 210 of the switching valve 200. Again, liquid can flow between the sample pick up means 12 and the sample storage section 312 without passing through a switching valve.

Additionally or alternatively, in the depicted embodiment, the sample storage section 312 is located between the sampling device 100 and the sample pick up means 12. Thus, as depicted, e.g., in FIG. 3, a sample can be readily drawn in from the sample pick up means 12 into the sample storage section 312 by a single movement of the sampling device 100.

Further, the system 1000 may also comprise a tubing 320, which may connect the metering device 100, and more particularly the port 108 of the metering device 100, with the switching valve 200, and more particularly with port 210 of the metering device 100.

The metering device 100 may be configured to generate a pressure difference via movement of the piston 102. The piston 102 may be configured to move outwards the housing 104 of the metering device 100, which allows the metering device to generate a pressure difference. The pressure difference generated may be used, for example, to retrieve a sample from the reservoir 8 via the sample pick-up means 12. For instance, the sample pick-up means 12 may be configured to travel to the sample reservoir 8 to retrieve a sample and travel back to the needle seat 10. Moreover, the sample may be stored in the needle 12 and also in the tubing 310. It will be understood that the sample loop 312 may also be used to store the sample retrieved from the sample reservoir 8 via the needle 12. The sample loop 312 may also be adapted to provide more mobility to the needle 12, i.e. it may allow the needle 12 to change its position via facilitating the change of length of the tubing 310. For example, the sample loop 312 may be realized as a coil or helix and this coil or helix may be configured to change its pitch, so that the sample loop 312 can change its length to allow movement of the needle 12.

The metering device 100 can move its piston 102 outwards of the metering device housing 108 to a position and then move further outwards to generate the pressure difference for sucking in the sample from the sample reservoir 8. The sample may then be introduced into the system via tubing 310. The sample may be first stored in the needle 12 and optionally also in the tubing 310. It will be understood that the sample may also be stored in the sample loop 312.

The liquid chromatography system 1000 may further be adapted to "pre-compress" the sample contained in the tubing 310, the sample loop 312 and the needle 12, e.g., to system pressure. For instances, in analysis performed in HPLC, the analytical pressures at an entrance of the separation column 20 (i.e., at the high-pressure side of the column) can exceed 400 bar, i.e. the pressures at which the sample is separated into its constituents can exceed 400 bar. In some instances, it may be on the order of a few hundred bar or even exceed 1000 bar, such as, for example, 1500 bar. Therefore, pre-compressing the component of the system 1000 containing the sample may be advantageous, as the pressure within the separation column 30 may significantly differ from the pressure within the parts of the system 1000 in contact with the atmosphere, such as the tubing 310, the sample loop 312 and/or the needle 12 (before the pressurization). Thus, the pre-compression may equilibrate the pressure within the system 1000, which may allow reducing the occurrence of pressure difference peaks. In one embodiment, the pre-compression may be performed via the metering device 100 by generating a positive pressure via the piston 106.

In simple words, the liquid chromatography system 1000 may be adapted to supply a pre-compression before injection of the sample. For instance, after a sample is collected in the tubing 310 and/or the sample loop 312, the metering device 100 may be used to supply pressure to the sample, i.e. the metering device 100 may be used to pre-compress the content of the tubing 310 and/or the sample loop 312 until reaching the analytical pressure, which, as discussed above, may be on the order of several hundred bar or even above 1500 bar. However, the sample may also be pre-compressed to a pressure lower than the analytical pressure. Moreover, the metering device 100 may also be used to decompress the system, which may be achieved via outward displacement of the piston 102 in order to reduce the pressure in the tubing 310 and/or sample loop 312. This may be advantageous, as it may allow a controlled pre-compression/decompression of the system 1000. This is further discussed in relation to FIG. 11.

The system 1000 may also be adapted to inject the sample from the tubing 310 and/or the sample loop 312 to the separation column 30 using a flow which may be supplied either via the pump 30 and/or the metering device 100.

The system 1000 may also be adapted for self-cleaning or self-washing. Particularly, the metering device 100 can draw in solvent, for example, from solvent reservoirs, through pressure difference supplied by the pump 30 and/or the movement of the piston 102 of the metering device 100. The solvent may travel through the tubing 320 to cross the metering device 100 and pass through the tubing 310 and the sample loop 312 to subsequently continue to the needle 12 and the needle seat 10, and the respective connecting elements of the valve 200 in order to remove any residual components of a previous sample or of the flow, which may be used to wash the system and drain the washing liquid to the waste reservoir 40. In some instance, the system 1000 may also be adapted to clean or purge the pump 30, for instance, when connecting to a different solvent reservoir.

Figure 2:
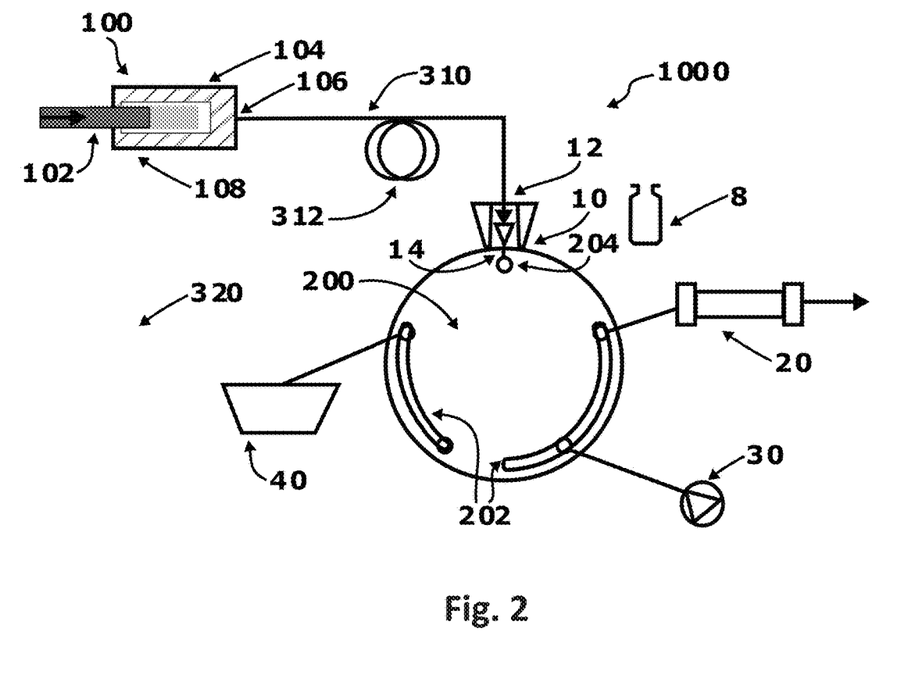
FIG. 2 depicts a configuration or state of the system system according to embodiments of the present invention, which may be referred to as an idle state.
Figure 3:
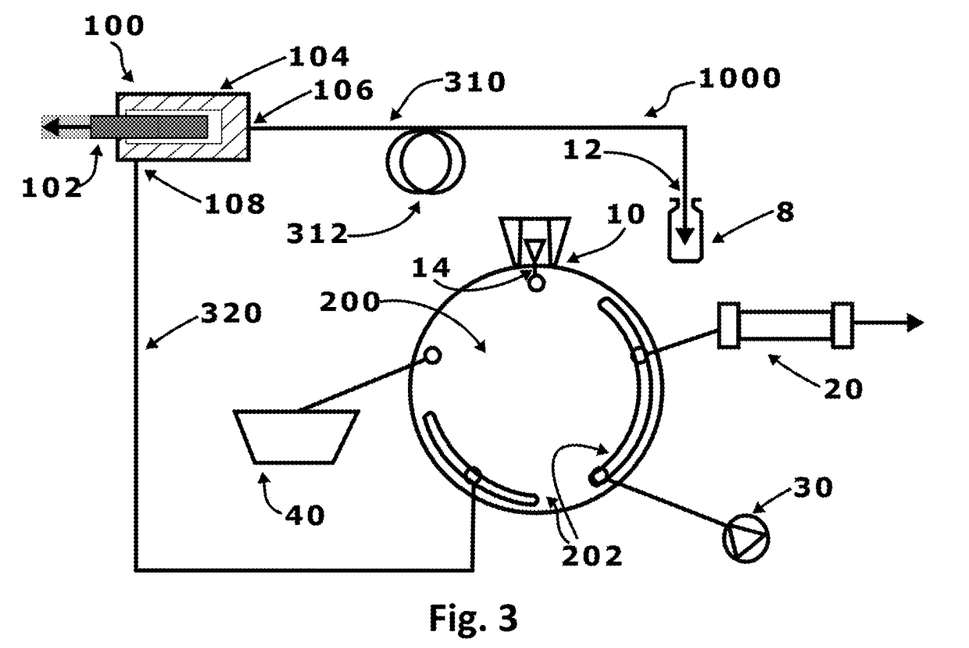
FIG. 3 depicts a further configuration or state of the system according to embodiments of the present invention, which may be referred to as a sample pick-up state.

FIG. 2 schematically depicts a configuration of the system 1000 according to embodiments of the present invention, which may be referred to as an idle state. In the idle state, the system 1000 may be adapted to allow the metering device 100 to forward for initialization without pressure build-up and the sample loop 310 may be bypassed and the pump 30 may be directly connected to the separation column 20.

In simple terms, the configuration depicted in FIG. 2 may allow the system 1000 to establish a fluidic connection between the separation column 20 and the pump 30 by connecting the ports 206 and 208 of the stator through a connecting element 202 of the rotor. Furthermore, a connecting element 202 of the rotor may also fluidly connect the tubing 320 with the waste collector 40, through the ports 210 and 212. In this configuration, the liquid flow supplied by the pump 30, for instance, a solvent, may flow directly to the separation column 30 without passing through any tubing, for example, 310, 312 and 320. In some instances, the idle state may be advantageous, as it may allow the metering device 100 to execute certain tasks, such as, for example, it may allow the metering 100 to get ready to start moving the piston 102 to an inward position (e.g., to the most inward position) within the housing 104 without generating any pressure difference in the tubing 310. Moreover, any excess of liquid contained in the tubing 320 may be directed to the waste 40. In simple words, this configuration may allow the metering device 100 to assume a starting position, for example, before starting to perform processes such as a sample drawing in.

FIG. 3 schematically depicts a configuration of the system 1000 according to embodiments of the present invention, which may be referred to as sample pick-up state. The system 1000 may assume the sample pick-up in order to be able to draw in a sample to be analyzed from the reservoir 8. In simple terms, in the sample pick-up state, the sample pick-up means 12 may travel to the sample reservoir 8 to collect a sample via introducing the needle 12 in the sample reservoir 8.

Moreover, the rotor may assume a configuration that allows to isolate the tubing 320 from the waste 40 and the pump 30, i.e. the switching valve 200 may be used to move the rotator to a position that allows to block the connection of the tubing 320, which also be referred to as generating a dead-end for the tubing 320. That is, in this configuration, port 210 which is connected to the tubing 320 is not fluidly connected to the waste 40. In more simple words, the system 1000 may assume a configuration that allows the tubing 320 to be connected to a dead-end. In this configuration, movement of the piston 102 of the metering device 100 may primarily affect the tubing 310 and the sample loop 312, i.e. the pressure difference provided by the metering device 100 may primarily have an effect on the needle 12, which may be used to draw in the sample from the reservoir 8 and transfer the collected sample towards the sample loop 312.

In more simple words, FIG. 3 schematically depicts how a sample is drawn from a sample reservoir 8 via the needle 12 before the needle 12 returns to the needle seat 10. In this position, the piston 102 of the metering device 100 may move outwards the housing 104 and therefore draw in the sample into the needle 12. That is, the metering device 100 is used to pull the sample from the sample reservoir 8 into the tubing 310, and such a configuration may also be referred to as loading of the sample pick-up means 12, as load configuration or simply as load. This process may be repeated as described in detail below. In other words, more sample may be introduced into the tubing 310 (and the sample loop 312).

Figure 4:
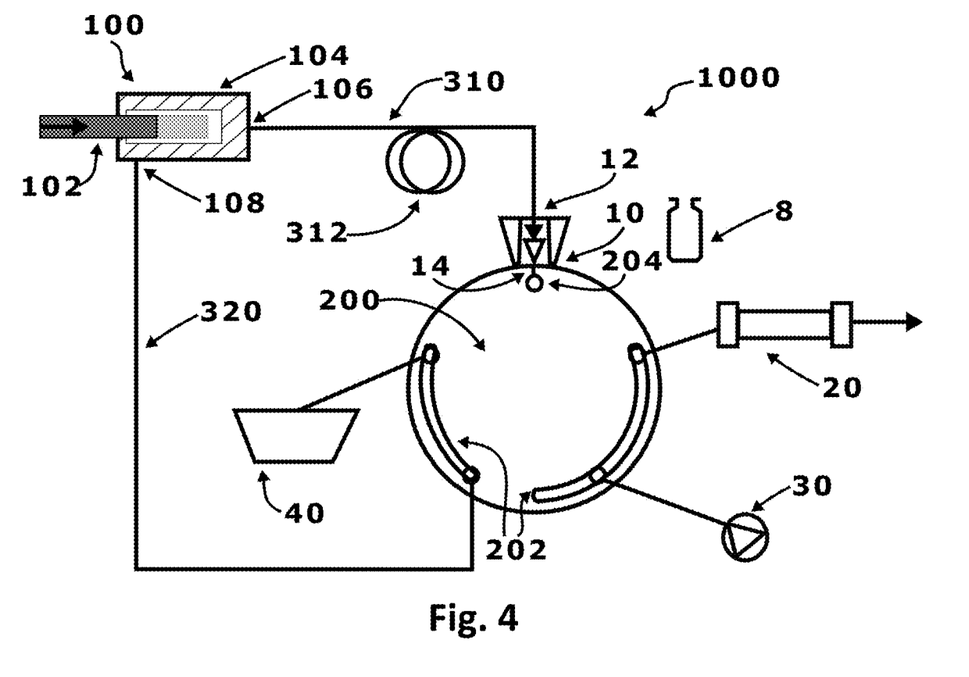
FIG. 4 depicts a still further configuration or state of the system according to embodiments of the present invention, which may be referred to as a drain state.

FIG. 4 schematically depicts a configuration of the system 1000 according to embodiments of the present invention, which may be referred drain state. In the drain state, the system 1000 may assume a configuration that establishes a fluidic connection between the pump 30 and the separation column 20 as well as a fluidic connection between the tubing 320 and the waste 40. The needle 12 may be located in the needle seat 10. Moreover, a connecting element 202 may re-establish the connection of the tubing 320 with the waste 40, and the port 204 directly fluidly connected to the needle seat 10 may be "closed" (e.g. connected to a "dead end"). The piston 102 of the metering device 100 may now move forward, e.g., return to its initial position and drain liquid in the tubing 320. Further, the metering device 100 may get ready to repeat the procedure explained in FIG. 3.

In simple words, the needle 12 may move to a position where it is closed (sealed), which may be a position, such as, for example, in a washing port, in the needle seat 10 or entirely elsewhere. Alternatively or additionally, a separate valve and/or a valve position may ensure that the metering device 100 closes on the side of the needle 12 and opens on the other side, i.e. on the side where the metering device 100 is connected to the tubing 320. Now, the piston 102 of the metering device 100 may move forward and empty the content of the tubing 320 and optionally the metering device 100 into the waste 40. Then, the position described in FIG. 3 may be approached again, which will be detailed below. In simple words, the processes described in FIG. 2 to FIG. 4 is detailed below in FIGS. 5 to 10.

In simple words, the needle 12 may move to a position where it is closed (sealed), which may be a position, such as, for example, in a washing port, in the needle seat 10 or entirely elsewhere. Alternatively or additionally, a separate valve and/or a valve position may ensure that the metering device 100 closes on the side of the needle 12 and opens on the other side, i.e. on the side where the metering device 100 is connected to the tubing 320. Now, the piston 102 of the metering device 100 may move forward and empty the content of the tubing 320 and optionally the metering device 100 into the waste 40. Then, the position described in FIG. 3 may be approached again, which will be detailed below. In simple words, the processes described in FIG. 2 to FIG. 4 is detailed below in FIGS. 5 to 10.

Figure 5:
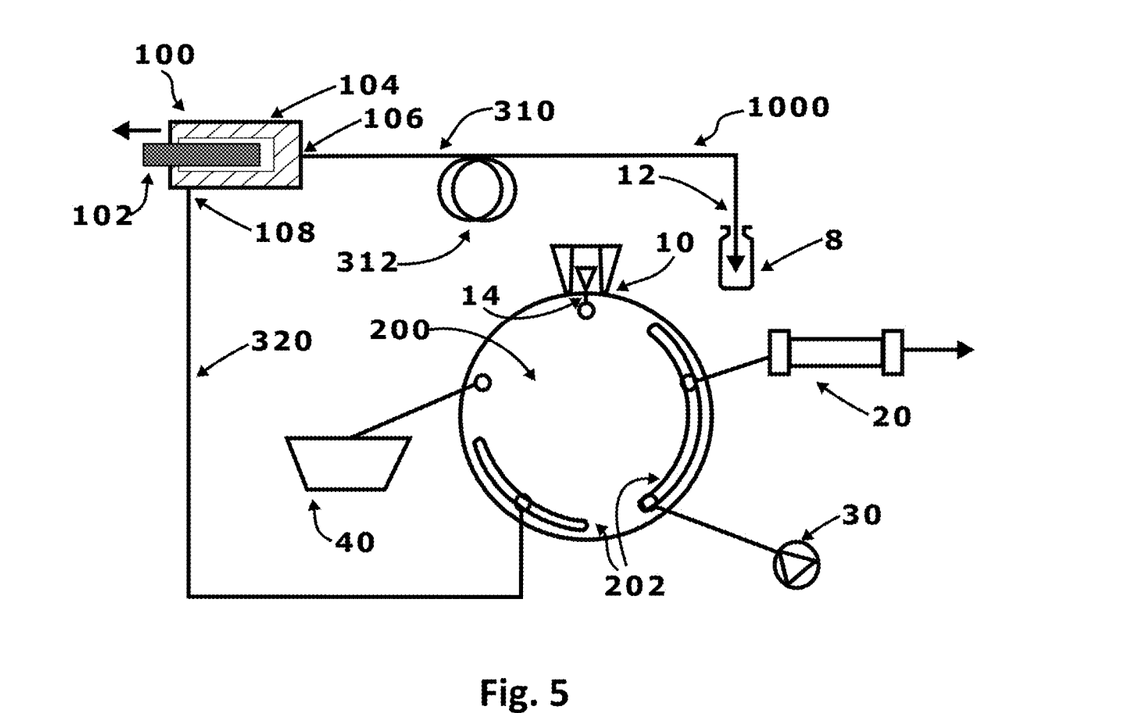
FIG. 5 depicts a still further configuration or state of the system according to embodiments of the present invention, which may be referred to as a beginning of drawing in sample according to embodiments of the present invention.
Figure 6:
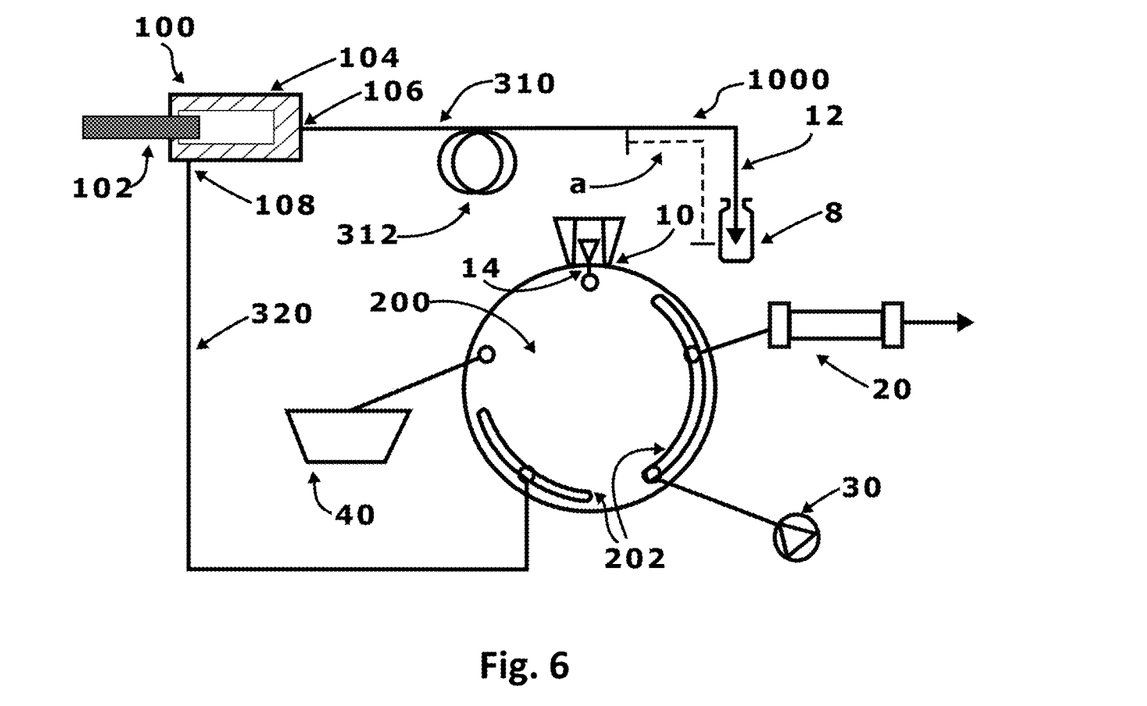
FIG. 6 depicts a still further configuration or state of the system according to embodiments of the present invention, wherein the piston of a metering device assumes a more outward position than in FIG. 5.

FIG. 6 schematically depicts a configuration of the system according to embodiments of the present invention following the step described in FIG. 5. It will be understood that the configuration in FIG. 6 greatly corresponds to the configuration in FIG. 5. In particular, the switching valve 200 assumes the same position and establishes the same connections as in FIG. 5. A difference, however, is that the piston 102 is moved more outwardly (i.e., in a more backward position) than in FIG. 5 and has thus drawn in sample from the sample reservoir 8. In simple words, after drawing in a sample into the needle 12 from a reservoir 8, a volume "a" of the sample may be contained in the needle 12 and part of the tubing 310.

Figure 7:
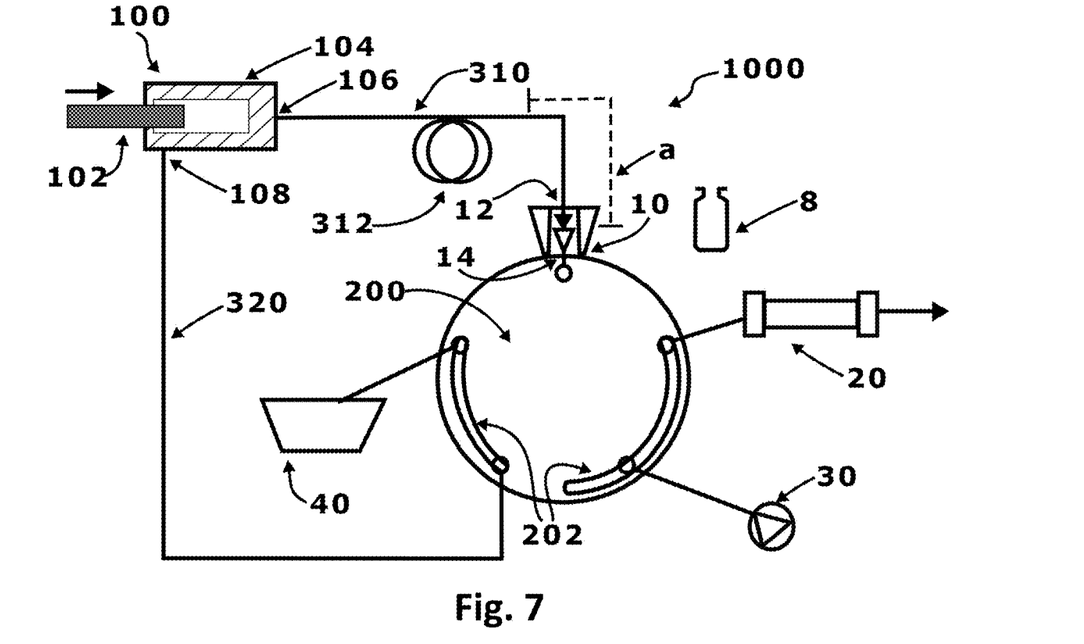
FIG. 7 depicts draining of the system according to embodiments of the present invention.

Subsequently, as depicted in FIG. 7, the needle 12 may travel back to the needle seat 10 and the needle seat 10 may be connected to a "dead end", e.g., the switching valve 200 may assume a configuration where port 204 (i.e., the port that is directly fluidly connected to the needle seat 14) is not connected to another port. However, alternatively or additionally, in embodiments including a valve controlling a connection between the sampling device 100 and the needle 12, this valve may also be closed, so that movement of the piston 102 does not affect the needle 12, but only the tubing 320 connected to port 308. In such a configuration, the draining of the system 1000 may begin, where the piston 102 may move inwards in the housing 104 (i.e., "forward"), pushing liquid in tubing 320 to the waste collector 40. In the configuration depicted in FIG. 7, the needle 12 is depicted to be positioned in the needle seat 10. However, it should be understood that this is not critical and that any other configuration connecting the needle 12 to a dead end is also usable.

Figure 8:
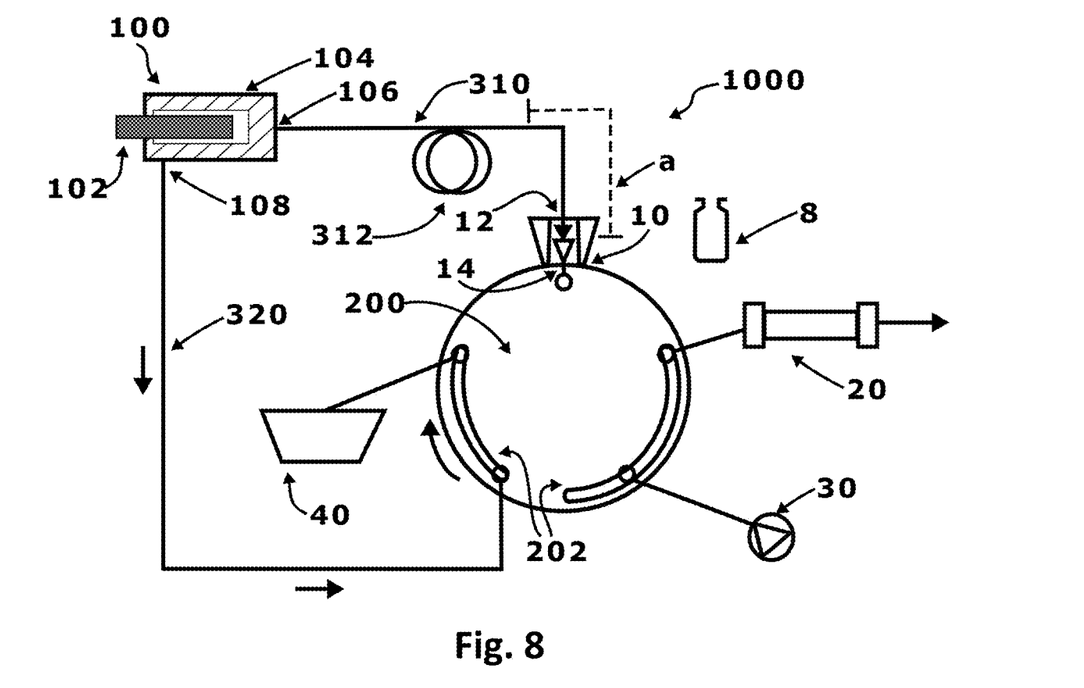
FIG. 8 depicts flow of the draining of the system and preparation of the metering device for a second drawing in of sample according to embodiments of the present invention.

The flow of the draining of the system 100 is schematically depicted in FIG. 8. Again, the configuration depicted in FIG. 8 is mostly identical to the configuration depicted in FIG. 7. Notably, the state of the switching valve is the same as in FIG. 7. However, what has again changed is the position of the piston 102 in the metering device 100. The piston 102 of the metering device 100 that has been positioned in an outward position (in FIG. 7) has now moved forward into the housing 104 of the metering device 100. Since the needle 12 is connected to a dead end, e.g., via connecting the port 204 to a dead end, the effect of the forward movement of the piston 102 of the metering device 100 is directed to the tubing 320, which is fluidly connected to the waste collector 40 (in other embodiments, this may be achieved by closing a valve controlling a connection of the sampling device 100 to the needle 12). Consequently, in this configuration, the system 1000 may drain liquid contained in the tubing 320 into the waste 40, while leaving the sample collected in the needle 12 unaffected, i.e. the sample drawn in the needle 12 remains in the sample tubing 310. That is, after this step, the metering device 100 is again ready to perform draining of the system as described in FIG. 4. As schematically depicted in FIG. 8, the connecting element 202 may establish a fluid connection between the tubing 320 and the waste 40. When the piston 102 moves inwards in the housing 104 of the metering device 100, liquid contained in the tubing 320 flows towards the waste 40 as shown by the arrows indicating the flow direction.

Figure 9:
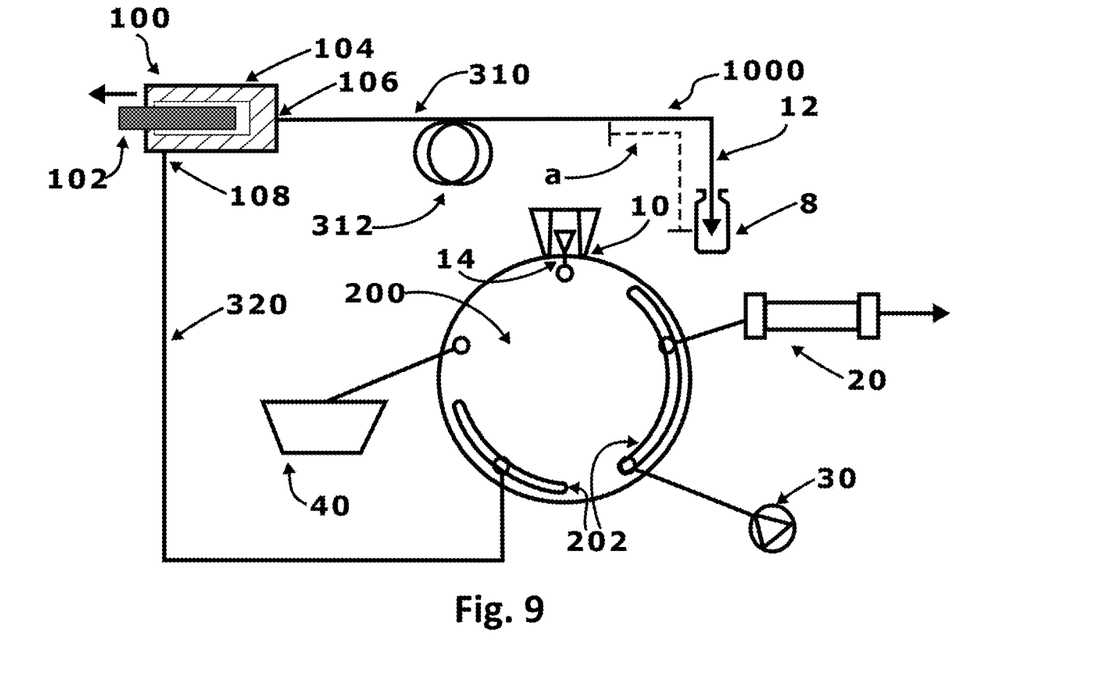
FIG. 9 depicts the beginning of a second drawing in according to embodiments of the present invention.

Once the piston 102 reaches an inward position in the housing 104 (see again FIG. 8), the system 100 may again assume the configuration schematically depicted in FIG. 9. The needle 12 may travel again to the sample reservoir 8 to perform a second draw in of sample. In this configuration, an initial amount of the sample identified by reference "a" may be already contained in the needle 12 and/or in the tubing 310. Now, the rotor may cut-off the connection of the tubing 320 to the waste 40, i.e., it may create a dead end at the tubing 320, which may allow to focus the effect of the metering device 100 to the needle 12. The piston 102 may initialize one more time its movement outwards to draw in a second volume of sample from the sample reservoir 8.

Figure 10:
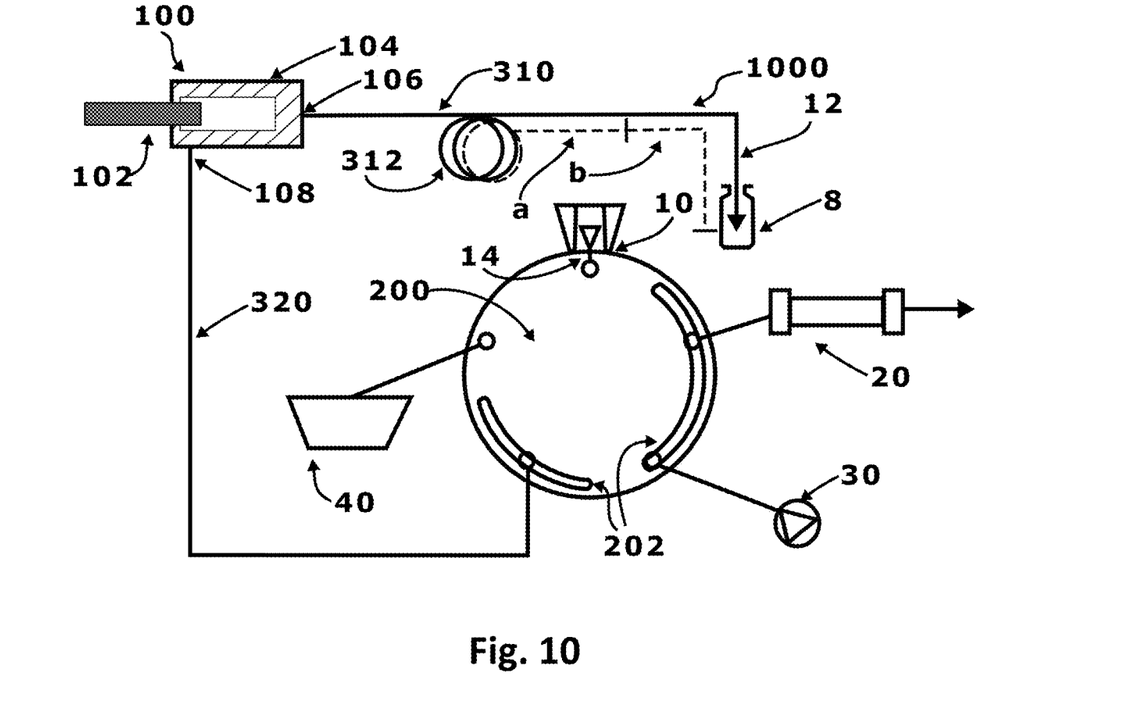
FIG. 10 depicts schematically two sample volumes drawn by the sample pick-up means according to embodiments of the present invention.

This is also depicted in FIG. 10. Again, FIG. 10 greatly corresponds to FIG. 9. In particular, the position of the switching valve 200 in FIG. 10 is the same as the position of the switching valve in FIG. 9. However, in FIG. 10, the piston 102 of the metering device 100 is positioned more outward than in FIG. 9. Once the piston 102 reaches an outward position (as in FIG. 10), a second volume of sample may be contained in the needle 12 and the tubing 310 as schematically depicted in FIG. 10. This amount of sample is identified by reference "b".

It will be understood that previously drawn in sample "a" may travel further "inside" of the tubing 310 (i.e., closer to the metering device 100), and for instance, within the sample loop 312 (i.e., generally, within the sample storage portion). In simple words, in a second sample drawing, the volume of the sample to be analyzed is represented by the firstly drawn in volume "a" and the secondly drawn in sample volume "b". It will thus be understood that a higher amount of sample may be drawn into the system 1000 and into the tubing 310 and the sample loop 312 than would be possible with only drawing in sample once. Further, it will be understood that these cycles may also be repeated more than once (i.e., performed more than twice in total). That is, after the configuration depicted in FIG. 10, the system 1000 may perform an additional loading cycle. That is, the system 1000 may again assume the configuration depicted in FIG. 4 and push out liquid to the waste 40, and may again assume the configuration depicted in FIGS. 5 and 6 to draw in further volume of sample.

In simple words, this repetition may be advantageous, as it may be possible to repeat the steps as many times as required to draw in a sample to be analyzed. As the size and stroke of the piston 102 of the metering device 100 cannot be change arbitrarily, e.g. increasing the size and/or stroke of the piston 102 is not always possible, the presently described technology may provide a method for sampling liquid volumes not limited by the volume and the maximum stroke of the piston 102 of the metering device 100. Put differently, the present technology may provide a method and system to perform a multi-drawing of samples in liquid chromatography. In other words, embodiments of the present invention may allow to use a sample volume for further analysis which is independent from the displaced volume of the metering device 100. This may render the presently described technology more versatile.

After the desired amount of sample has been introduced into the tubing 310 and the sample loop 312, the sample may be introduced into the column 20 (e.g. the separation column). Preferably, this is not done directly, but the sample is first brought to an elevated pressure, e.g., to a pressure corresponding to (or being similar to) the pressure in the separation column 20. This may be done via an additional pre-compression step schematically depicted in FIG. 11. In this configuration, the switching valve 200 may block the connection of the tubing 320 to the waste 40. That is, the tubing 320 may be connected to a dead end. Further, also the needle 12 may be connected to a dead end. Then, piston 102 may move towards the inside of the metering device 100, which may allow to supply pressure to the tubing 310 and sample loop 312 and consequently "pre-compress" the sample, i.e., bringing the sample to an elevated pressure.

Figure 11:
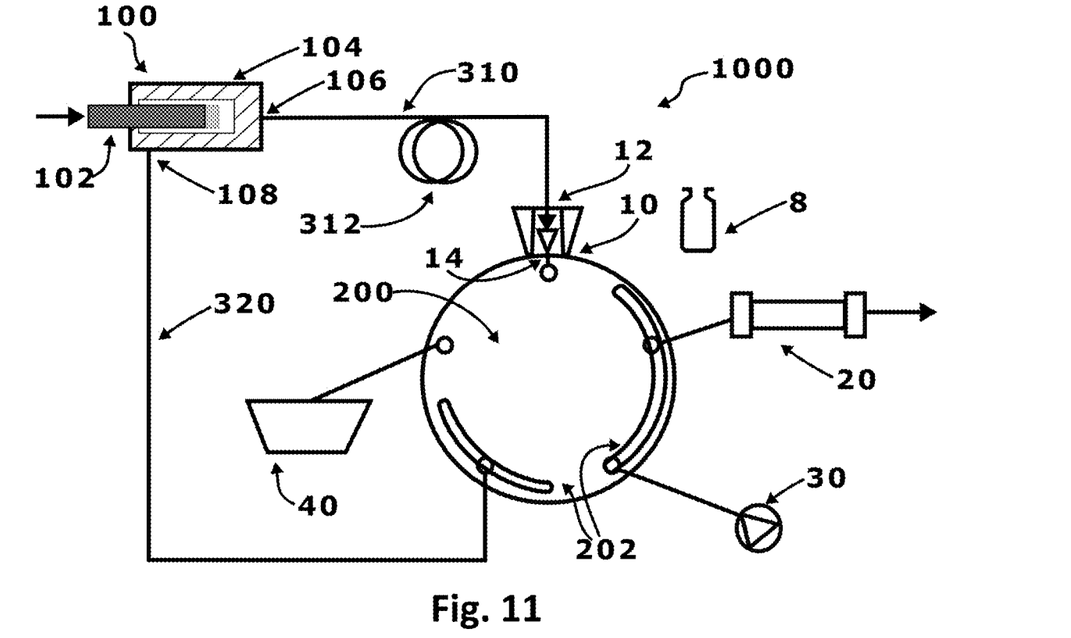
FIG. 11 depicts schematically pre-compression of the system according to embodiments of the present invention.

In simple words, FIG. 11 schematically a configuration of the system 1000 where the sample collected by the sample pick-up means 12 and allocated in the tubing 310 and/or the sample loop 312 may be pressurized before the injection to the separation column 20, i.e. the sample may be pre-compressed. The switching valve 200 may switch back to a compress position, i.e., to the position where tubing 320 and the needle 12 are both connected to dead ends. In the depicted configuration, the pick-up means 12 may rest on the needle seat 10 and may not be connected to the ambient atmosphere. In other words, the needle 12 and the needle seat 10 may be isolated from the ambient atmosphere. Thus, the piston 102 in the metering device 100 may move forward, such that volume in the tubing 310 (including the sample loop 312) may be compressed, which may be performed until the analytical pressure is reached. I.e., the sample in the tubing 310 may be brought to an elevated pressure, such as, for example, the pressures at which the analysis takes place (i.e., the pressure at the beginning of the column). In other words, the metering device 100 may be used to pre-compress or pressurize the sample contained in the tubing 310. In one embodiment, the system 1000 may further comprise a pressure sensor configured to monitor the pressure in the tubing 310, 312 and 320. Furthermore, the pressure sensor may also be used to monitor a possible additional decompression step (not depicted) of a given section of the system 1000. That is, it may generally be possible to monitor the pressure in the tubing 310 and gradually adapt the pressure to a required pressure, such as, for example the atmosphere pressure and/or the analytical pressure.

Figure 12:
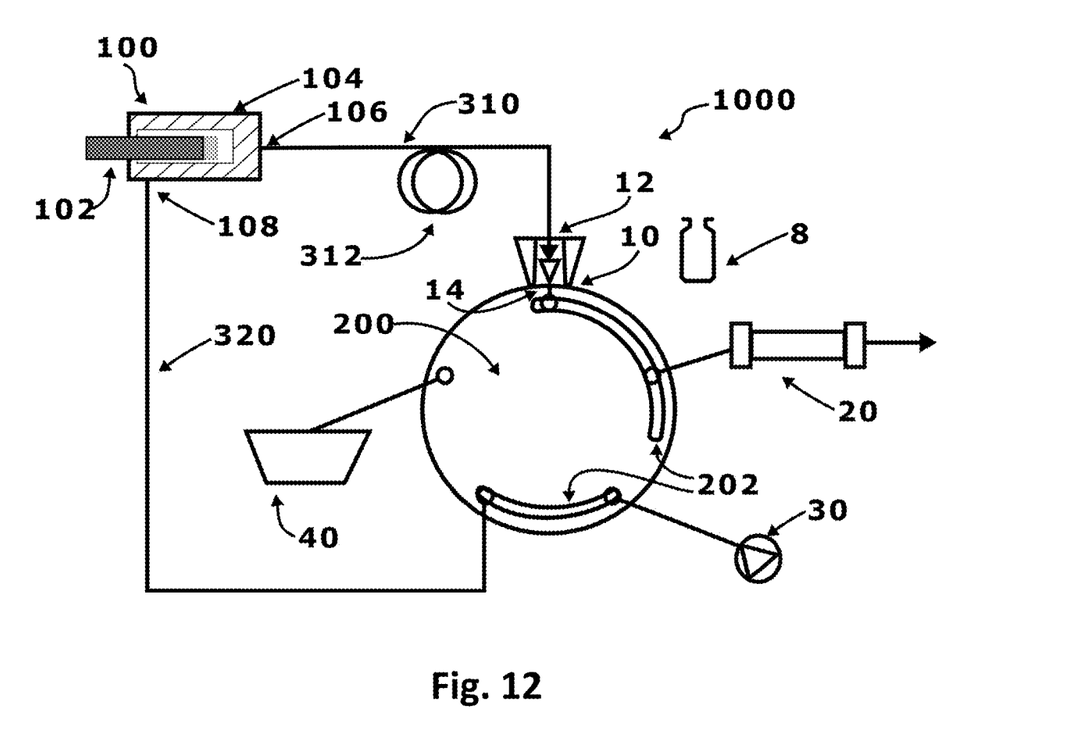
FIG. 12 depicts schematically injection of a sample to be analyzed according to embodiments of the present invention.

After the desired pressure is reached, the sample may be introduced into the separation column 20. This may be done by a configuration schematically depicted in FIG. 12. FIG. 12 schematically depicts a configuration of the system 1000, in which the sample may already have been pre-compressed and may be ready for being injected to the separation column 20. Therefore, this configuration may be referred to as inject configuration. The switching valve 200 may assume a configuration such that the separation column 20 and the needle seat 10 may be in fluidic connection, i.e. in a such configuration that may allow to introduce the sample into the analytical flow in such a way that the analytical flow pushes the sample into the separation column 20. Such process may be referred to as the step of switching the valve 200 to the injection position. In this position, the sample may be injected into the separation column 20, e.g., by means of the pump 30.

That is, in simple words, the metering device 100 can close via a needle tip 12 at the end of a sample path, after the sample has been drawn in, which may also be referred to as "load". Simultaneously the path at the rear on the other side may be closed so that, when the piston 102 is moved forward, the metering device 100 may drain any liquid, for example, a solvent, contained in the piston chamber 102 to the rear into the waste 40, which also be referred to as "drain", without the sample moving. The needle 12 can then be moved back into the sample, the control valve 200 switched to "load" and the piston 102 retracted in order to draw further sample into the sample loop. This process can be repeated until the entire sample loop 312 is filled with sample and/or until the metering device 100 is started. The maximum sample quantity no longer depends on the piston 102 and its maximum stroke length, but on the volume of the sample loop 312 from the control valve 200 to the metering device 100. Finally, the sample path including the sample and metering device 100 may be switched into the analytical path, which may also be referred to as "inject".

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

What is claimed is:

1. A method for collecting a sample for sample analysis, the method comprising:
    drawing a first portion of the sample into a sample storage portion of a chromatography system while the chromatography system is in a first configuration, the chromatography system comprising:
        A) a metering device including a first connecting port and a second connecting port;
        B) a switching valve including a first port, a second port, a third port, a fourth port, and a fifth port;
        C) a sample pick-up needle;
        D) a first tubing that connects the first connecting port of the metering device with the sample pick-up needle; and
        E) a second tubing that connects the second connecting port of the metering device with the fourth port of the switching valve,
    wherein in the first configuration, the sample was pulled into the first tubing, the method further comprising:
    switching the chromatography system to a second configuration, wherein the first configuration is different from the second configuration;
    sealing an end of the sample pick-up needle and then draining a portion of a liquid from the second tubing while in the second configuration;
    switching the chromatography system to a third configuration;
    drawing a second portion of the sample into the sample storage portion of the chromatography system while the chromatography system is in the third configuration;
    switching the chromatography system to an injection configuration; and
    fluidly connecting the sample storage portion to the chromatography column and supplying the first portion of the sample and the second portion of the sample from the sample storage portion to the chromatography column while the chromatography system is in the injection configuration.

2. The method according to claim 1 further comprising:
    switching the chromatography system to an isolation configuration;
    isolating the chromatography system from a surrounding environment while the chromatography system is in the isolation configuration, wherein the isolation configuration is different from the first, the second, and the third configuration; and
    pressurizing the sample storage portion to a first pressure while the chromatography system is in the isolation configuration.

3. The method according to claim 2, wherein the chromatography system is a liquid chromatography system, wherein the first pressure exceeds an ambient pressure by at least 500 bar.

4. The method according to claim 2, wherein the chromatography system is a liquid chromatography system, wherein the first pressure exceeds an ambient pressure by at least 1000 bar.

5. The method according to claim 1, wherein the third configuration is identical to the first configuration.

6. The method according to claim 1, wherein the first portion of the sample and the second portion of the sample are supplied together from the sample storage portion to the chromatography column.

7. The method according to claim 1, wherein the chromatography system does not switch to the injection configuration between the switching of the chromatography system to the first configuration and the switching of the chromatography system to the third configuration.

8. The method according to claim 1 further comprising:
after the drawing the second portion of the sample into the sample storage portion, switching the chromatography system to the second configuration;
sealing the end of the sample pick-up needle and then draining another portion of the liquid from the second tubing while in the second configuration;
after the draining another portion of the liquid from the second tubing while in the second configuration, switching the chromatography system to the third configuration;
drawing a third portion of the sample into the sample storage portion of the chromatography system while the chromatography system is in the third configuration;
after the drawing the third portion of the sample into the sample storage portion, switching the chromatography system to the injection configuration; and
fluidly connecting the sample storage portion to the chromatography column and supplying the first portion, the second portion, and the third portion of the sample from the sample storage portion to the chromatography column while the chromatography system is in the injection configuration.

9. The method according to claim 1, wherein the first tubing comprises a sample storage section.

10. A liquid chromatography system comprising:
A) a metering device including a first connecting port and a second connecting port;
B) a switching valve comprising a stator and a rotor, the stator comprising a first port, a second port, a third port, a fourth port, and a fifth port, the rotor comprising a first groove and a second groove;
C) a sample pick-up needle;
D) a first tubing connecting the first connecting port of the metering device with the sample pick-up needle;
E) a second tubing connecting the second connecting port of the metering device with the fourth port of the switching valve;
F) a chromatography column, wherein an inlet of the chromatography column connects to the second port;
G) an analytical pump adapted to provide a flow of pressurized fluid, the analytical pump connecting to the third port;
H) a seat configured to receive the sample pick-up needle, the seat connecting to the first port;
I) a waste reservoir connected to the fifth port, and
J) a controller comprising a data processing unit, the controller configured to control the liquid chromatography system to
a) switch the switching valve to one of a first configuration, a second configuration, a third configuration, an injection configuration, and an isolation configuration;
b) draw a first portion of the sample into a sample storage portion of the liquid chromatography system, wherein the sample was pulled into the first tubing, while the chromatography system is in the first configuration;
c) seal an end of the sample pick-up needle and then drain a portion of a liquid from the second tubing while in the second configuration;
d) draw a second portion of the sample into the sample storage portion of the liquid chromatography system while the liquid chromatography system is in the third configuration; and
e) fluidly connect the sample storage portion to the chromatography column and supply the first portion of the sample and the second portion of the sample from the sample storage portion to the liquid chromatography column while the liquid chromatography system is in the injection configuration.

11. The liquid chromatography system of claim 10, wherein the controller is further configured to control the liquid chromatography system to
f) isolate the chromatography system from a surrounding environment while the liquid chromatography system is in the isolation configuration, wherein the isolation configuration is different from the first, the second, and the third configuration; and pressurize the sample storage portion to a first pressure while the liquid chromatography system is in the isolation configuration.

* * * * *